United States Patent [19]
de la Poype

[11] 3,886,714
[45] June 3, 1975

[54] MACHINE FOR MAKING AND FILLING SACHETS

[75] Inventor: Roland de la Poype, Paris, France

[73] Assignee: Prepac (S.A.R.L.), Villejuif, France

[22] Filed: July 11, 1974

[21] Appl. No.: 487,799

[30] Foreign Application Priority Data
Aug. 13, 1973 France .............................. 73.29661

[52] U.S. Cl. ................................................ 53/180
[51] Int. Cl. .............................................. B65b 9/12
[58] Field of Search .............................. 53/180, 182

[56] References Cited
UNITED STATES PATENTS
| | | | |
|---|---|---|---|
| 1,546,361 | 7/1925 | Bates | 53/180 X |
| 3,826,061 | 7/1974 | Hunter | 53/182 |

Primary Examiner—Travis S. McGehee
Attorney, Agent, or Firm—Waters, Schwartz & Nissen

[57] ABSTRACT

A machine for making and filling sachets comprises a delivery pipe which is connected to a constant level reservoir and is directed downwards to permit a tubular sheath to be formed therearound. A longitudinal welding press forms at least one longitudinal seam of the sheath and a transverse welding press forms transverse seams and separates filled sachets from the sheath. The lower end of a rod extending longitudinally through the delivery pipe is fitted with a valve and cams on a rotatable camshaft respectively, control operation of the welding presses of feed rollers which feed the sheath longitudinally. A spring urges the valve to the closed position thereof and operating means controls longitudinal movement of the rod to effect opening of the valve.

7 Claims, 4 Drawing Figures

MACHINE FOR MAKING AND FILLING SACHETS

BACKGROUND OF THE INVENTION

1. Field of the Invention

This invention relates to a machine for making and filling sachets and in particular to a machine of this kind for filling liquid individual sachets, made by the machine itself from a strip of weldable material, with a liquid.

2. Description of the Prior Art

Machines of the said kind are provided with one or two rolls of a strip of plastics material. The strip is folded over or the two strips are brought together and a weld or two welds longitudinally extending convert the strip or strips into a continuoustubular sheath. A welding press makes a first transverse weld, which closes the sheath at the bottom. A metered amount of liquid is introduced into the sheath, and then a second transverse weld closes the sheath above the level of the liquid and a cut made at the level of this second weld detaches from the sheath a sachet filled with liquid.

Known machines of this kind are provided with metering means the object of which is to measure the amount of liquid introduced into the sheath for the filling of each of the successive sachets.

These metering means are independent of the elements making the sheath, lowering the sheath, and converting it into individual sachets. The metering means may comprise a metering pump or an electric valve with time controlled opening, or a reservoir of known volume which is alternately filled and emptied.

This method of effecting the metering necessitates co-ordination of the operations of the various elements, in order to ensure that the metering means perform their work at the desired moment and during the period of time which they require. The co-ordination of the operations is effected by means of electric timing means (timing circuits or relays), and through the use of drive means such as electromagnets or pneumatic power cylinders associated with electrically operated distributors.

Because of the very existence of timing means in these machines, the latter are complex and are provided with electric or pneumatic circuits which are likewise complex. Their adjustment and maintenance entails the intervention of qualified specialists.

SUMMARY

The invention is based on the realisation, which up to the present time has escaped the attention of those skilled in the art, that metering means of the kinds which have existed up to the present time are unnecessary in this kind of machine. It is possible to eliminate them and consequently considerably to simplify the construction and maintenance of the machine.

It has been found that the welding press making the top and bottom transverse welds which close the sachets can be utilised in combination with rollers which effect the lowering of the sheath at a constant speed, in order to serve as metering means. The time elapsing between the making of two transverse welds and the speed of descent of the sheath determine the volume of liquid which fills each sachet. Another parameter is the rate of flow of the liquid. This rate of flow is kept constant by causing the liquid to descend by gravity from a constant level reservoir, with the aid of a vertical pipe which passes down inside the sheath and which ends above the level of the welding press, in the transverse direction.

In certain circumstances it is desirable to be able to adjust the flow of liquid.

According to the invention this result is achieved in a simple manner by installing a valve seat and a valve at the bottom end of the tube. The valve is adjustable in position in relation to the seat in a very accurate manner, and can also be applied completely against the seat, thus enabling the flow of liquid to be interrupted entirely.

DESCRIPTION OF THE PREFERRED EMBODIMENT

Figure 1:
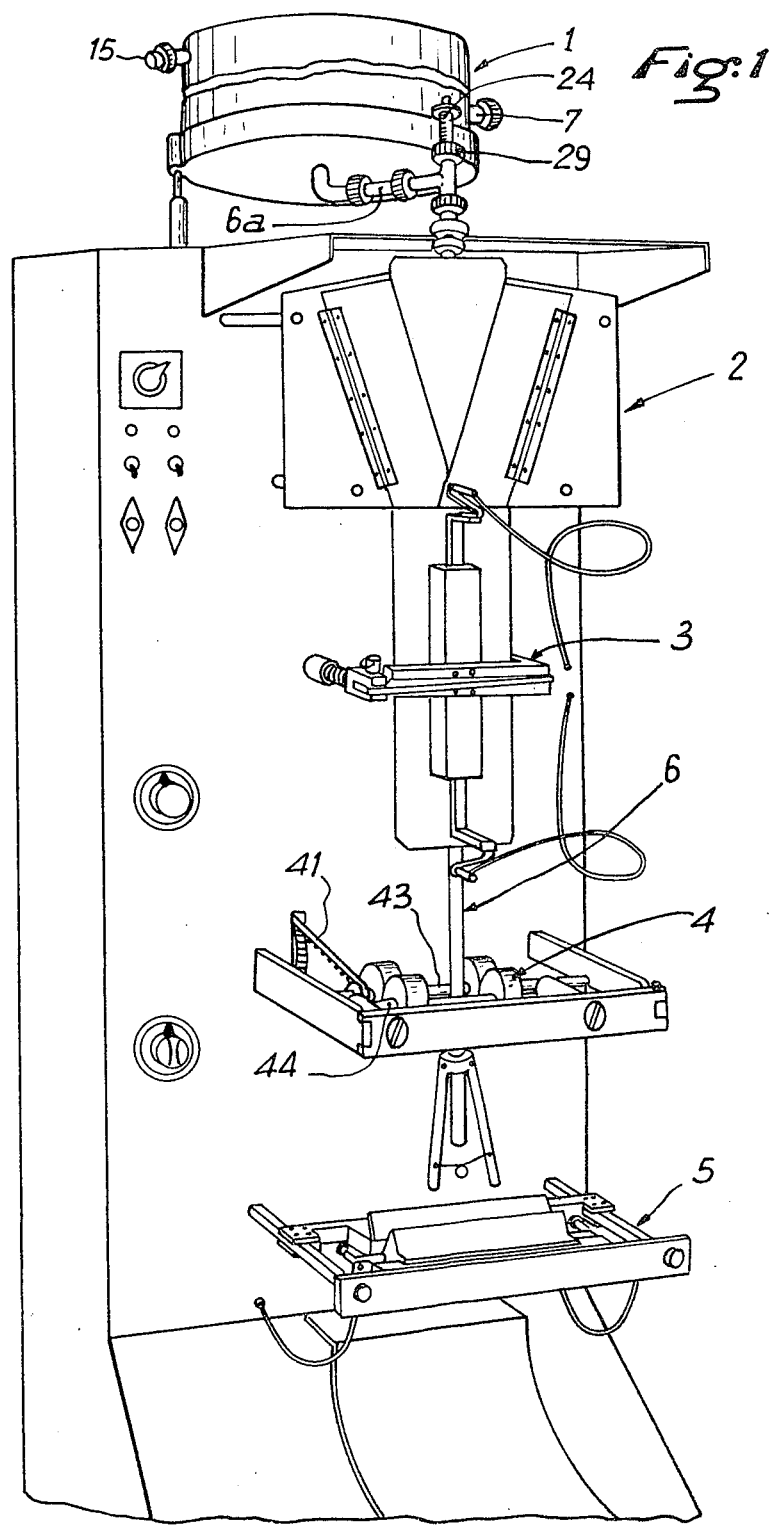
FIG. 1 is a general view in perspective of a machine according to the invention.

The machine illustrated generally in FIG. 1 is of a kind known per se and, consequently, only its main elements will be indicated and only the new parts according to the invention will be described in detail.

Referring to FIG. 1, an upper reservoir 1 which receives the liquid which is to be packed in sachets is mounted on a frame and a shaper 2 is provided, which in this machine serves to fold over, like a sleeve, a strip of weldable plastics material (not shown), together with a longitudinal welding press 3 which produces a continuous longitudinal weld converting the strip of plastics material into a continuous tubular sheath. Rollers 4 driven rotatably draw the sheath downwards and a second welding press 5, for transverse welding, effects on the sheath transverse longitudinally spaced welds, which close it, and makes cuts which divide the continuous sheath into individual closed sachets.

A delivery pipe 6 for the liquid to be packaged extends towards the bottom from the upper reservoir 1, inside the sheath, and ends above the second, transverse, welding press 5.

The object of the invention is to give to the basic elements which have just been mentioned suitable characteristics making it possible to meter the liquid introduced into the sachets without providing the machine with electric or pneumatic circuits or with special metering means, as has hitherto been the custom.

According to the invention this result is achieved by means of the following arrangements.

Figure 2:
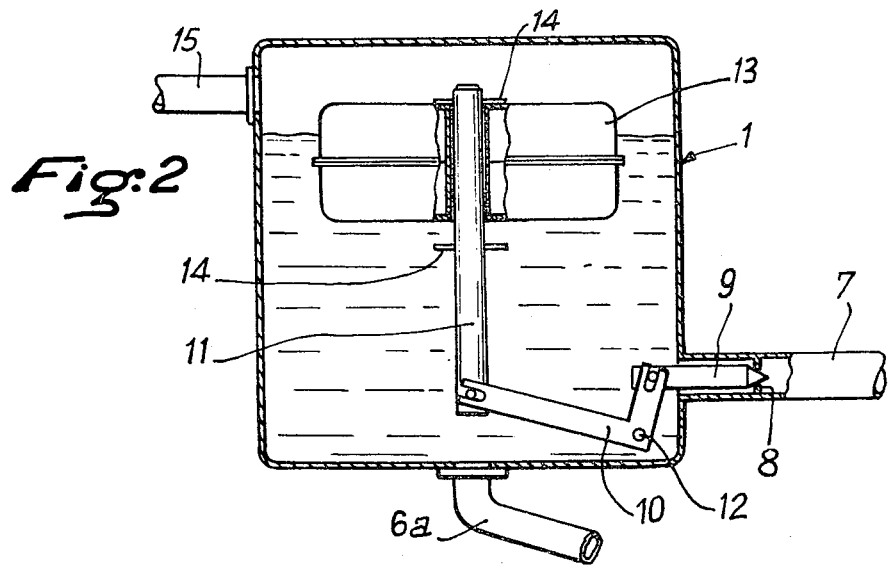
FIG. 2 is a detailed view in section of a constant level reservoir embodied in the machine.

As can be seen in FIG. 2, the upper reservoir 1 is a constant level reservoir of a kind known per se and capable of being made in numerous forms. In FIG. 2 the reservoir 1 is provided near the bottom thereof with a liquid supply pipe 7 inside which is fixed a seat 8. The seat 8 is associated with a needle 9 which is mounted for axial sliding movement and is connected by a bent lever 10 to a vertical spindle 11. The bent lever 10 is mounted so as to be free to oscillate about a pivot 12, while a float 13 is held by stops 14 on the spindle 11.

The reservoir 1 is also provided at the top with a pipe 15 which serves to discharge air from the reservoir, and the centre of the bottom of the reservoir is provided with a tube forming a horizontal branch 6a of the liquid delivery pipe 6.

Figure 3:
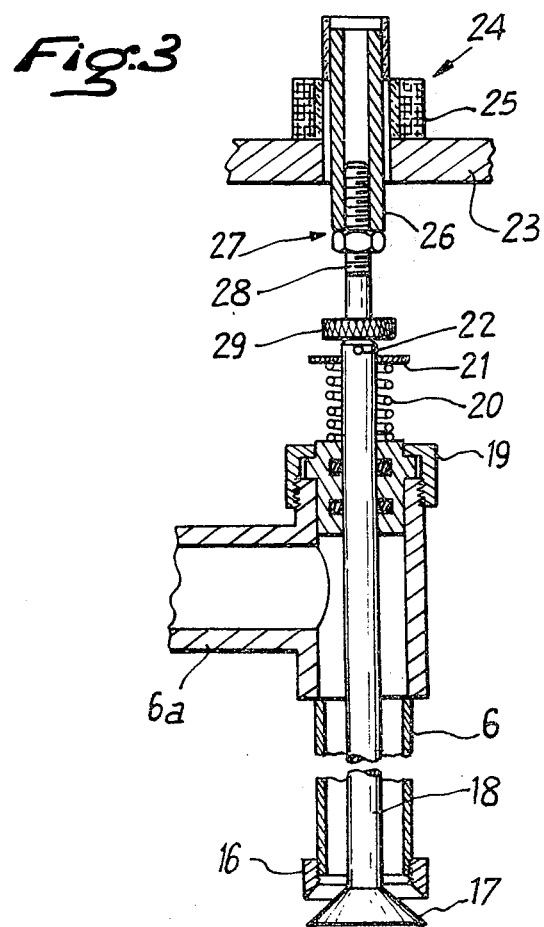
FIG. 3 is a partial view, in section, of liquid delivery pipe, with a valve at its bottom end, as embodied in the machine.

In FIG. 3 it can be seen that the horizontal branch 6a is connected by a 90° elbow to a vertical branch 6 which extends downwards to a point above the transverse welding press 5.

The lower end of the pipe 6 is provided with a valve seat 16 arranged to co-operate with a valve 17. The valve 17 is fixed to the lower end of a rod 18 which extends inside the pipe 6 and passes out of the pipe 6 through the vertical portion of the 90° elbow. O-rings housed in a guide for the rod 18 are disposed at this point around the rod 18 in order to provide a seal, while enabling the rod to slide longitudinally.

A nut 19 holds the guide in place and the guide serves to support one end of a compression return spring 20. The other end of the spring 20 is applied against a washer 21 located on the rod 18 by a crosspin 22. Under the action of the return spring 20 the rod 18 is pushed upwards and the valve 17 is applied firmly against its seat 16. The tube 6 is then closed and liquids cannot pass out of it.

On a part 23 of the frame of the machine, above the rod 18, is mounted an operating means 24. The operating means comprises a solenoid 25 having a movable core 26 which is connected to the rod 18 by an adjustable means 27 making it possible for the relative positions of the core 26 and rod 18 to be adjusted in the axial direction.

The core 26 is preferably at least partially hollow and is screw-threaded. A screw-threaded rod 28 provided with a lock-nut is screwed into the core 26; the lower end of the rod 28 is provided with a plate or nut 29, which bears against the upper end of the rod 18.

It will be observed that the rod 18 and the screw-threaded rod 28 can be a single element. In both cases, after slackening the lock nut 27, the plate or nut 29 can be rotated to move the threaded rod 28 to a greater or lesser depth in the core 26 and consequently to adjust the size of the aperture of the valve 17 in relation to its seat 16. Thus, the rate of flow of liquid passing out of the pipe 6 can be adjusted. The nut 29 may advantageously be calibrated and associated with a reading mark.

As an alternative, the solenoid 24 may be replaced by a cam supported by the frame 23 and mounted for pivotal movement on the frame and for operation by hand. This cam may act on an element equivalent to the core 26 and, like the latter, connected to the rod 18 by a means which is adjustable in the axial direction.

Figure 4:
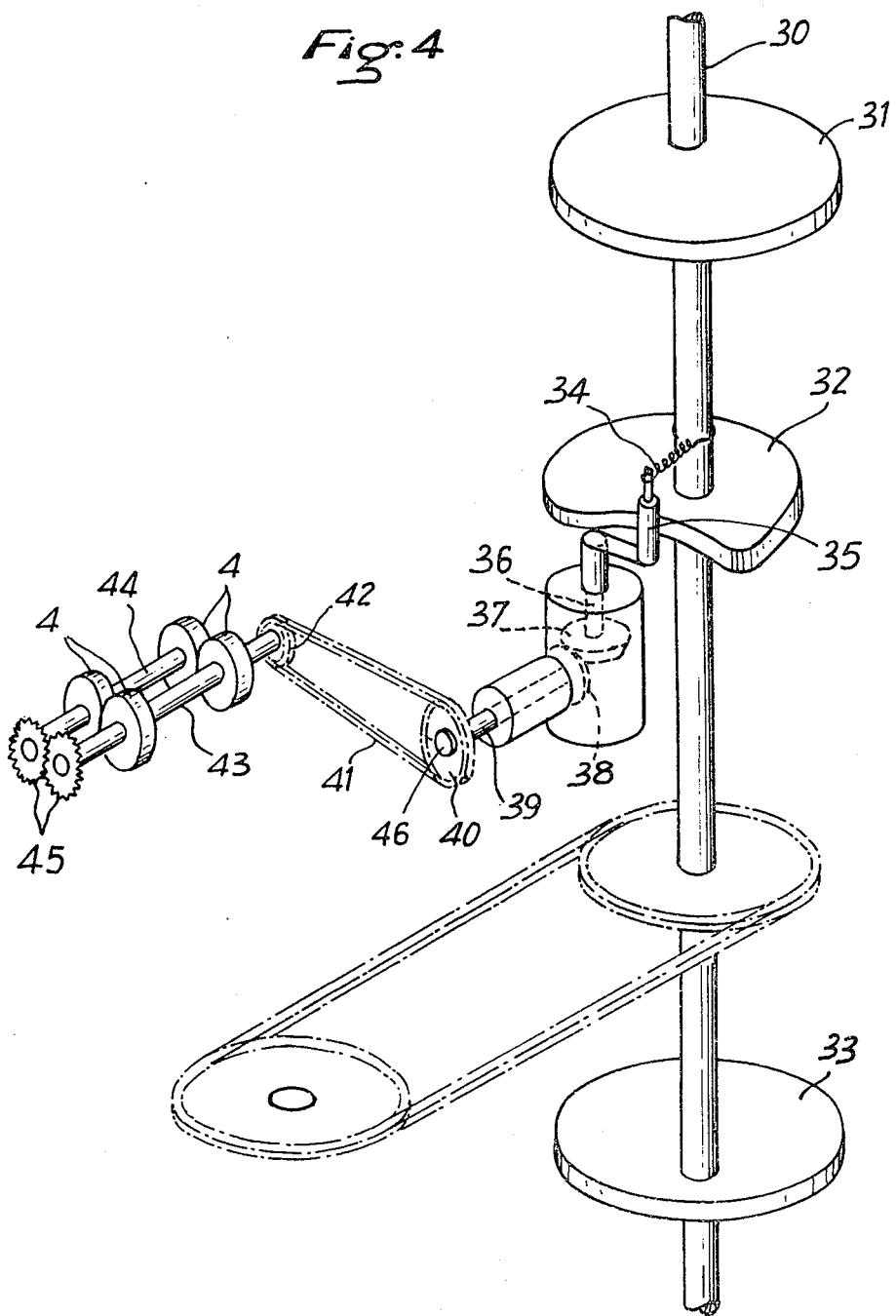
FIG. 4 is a diagrammatic view showing a camshaft controlling the operation of the elements of the machine.

FIG. 4 shows a camshaft 30 arranged to be mounted vertically inside the frame and guided and supported by bearings (not shown).

The camshaft 30 is the sole means which serves to control the operation of all the elements of the machine.

The camshaft 30 carries three cams 31, 32, 33 and is rotatably driven by means of two pinions and a chain by a motor (not shown).

The cam 31 is disposed at the level of the longitudinal welding press 3 and, by co-operating with return means, alternately effects opening and closing of the press 3. This method of operating the press 3 is known per se; it is therefore not necessary to give a more detailed description. The same is true of the cam 33, which is disposed at the level of the transverse welding press 5 and which effects opening and closing of the latter.

The cam 32 is disposed at the level of the sheath lowering rollers 4. A cam-follower 35, which forms part of a crank keyed on a shaft 36, is applied against the operative face of the cam 32 by means of a spring 34. The shaft 36 carries a bevel pinion 37 which meshes with another bevel pinion 38 keyed on a shaft 39 which carries a sprocket 40 connected by a chain 41 to another sprocket 42. The sprocket 42 is fixed to one end of a shaft 43 on which two axially spaced rollers 4 are fastened. A shaft 44 parallel to the shaft 43 carries two other axially spaced rollers 4 which co-operate with the two first mentioned rollers to grip between them the opposite edges of the sheath, not shown, and to drive the sheath positively in a downward direction. The shafts 43 and 44 are coupled rotationally by two gears 45.

The profile of the cam 32 is such that on each rotation it pushes back the follower 35, causing it to pivot about 45°. This movement is transmitted by the gearing 37, 38, the sprockets 40, 42 and the chain 41 to the rollers 4, which cause the sheath to be lowered by a correspondingly clearly determined length. When the follower 35 returns to its original position under the action of the spring 34, this movement is not transmitted to the rollers 4 because of the action of a freewheel coupling 46 mounted on the shaft 39 between the latter and the sprocket 40.

The operation of the machine is as follows:

In the position of rest the spring 20, FIG. 3, closes the pipe 6 by means of the valve 17. During operation the float 13 allows liquid to enter the reservoir 1 to a predetermined level and it keeps this level constant during opertion by acting on the needle 9.

As soon as the sheath has been formed and the press 5 has made the first transverse weld closing the sheath, the valve 17 is opened by means of the solenoid 24 or of the cam which may be installed instead of the latter.

The liquid then flows through the pipe 6 at a rate of flow adjusted by acting on the adjustable means 27, as explained above.

The pipe 6 remains permanently open during the operation of the machine, and the liquid flows with a constant rate of flow, without interruption, from the reservoir 1.

The camshaft 30 effects mechanically, and in a constant manner, the co-ordination of the operation of the main elements, namely the two welding presses 3 and 5 and the rollers 4.

The time elapsing – determined in an invariable manner by the cam 33 – between two closures of the transverse welding press 5 and the downward stroke of the sheath under the action of the rollers 4 (this stroke being determined in an invariable manner by the cam 32) determine the amount of liquid which is enclosed in a sachet between two successive transverse welds.

Thus, through a simple mechanical arrangement it is possible to achieve, with the aid of the basic elements of the machine, a metering which makes it possible for any other additional metering means, which would be expensive and difficult to service, to be eliminated. In practice it has been found that the accuracy achieved is satisfactory.

The machine is useful mainly for packing milk in individual sachets made from a sheet of weldable plastics material. It is used in milk producing countries and regions where it is particularly desirable to have available simple and robust machines not requiring technically highly skilled labour for their maintenance. In this respect, in addition to its unexpected character, the invention provides very appreciable progress in the direction of simplification.

I claim:

1. A machine for making and filling sachets, produced from at least one strip of suitable material, comprising a frame which supports an upper reservoir, a delivery pipe extending downwards from the reservoir, at least one longitudinal welding press arranged to form a tubular sheath from the strip, sheath-feeding rollers driven rotationally and arranged to grip and feed the sheath downwardly, the said rollers being mounted on the frame below the longitudinal welding press, and a transverse welding press mounted on the frame below the rollers, wherein the upper reservoir is of known constant level kind, wherein the delivery pipe is provided at its lower end with a valve seat and a valve associated with the seat is mounted on a rod which extends longitudinally inside the pipe and is adjustable in position in the longitudinal direction in relation to the pipe and wherein a cam-shaft supported by the frame is driven rotationally by a single motor and is provided with three cams arranged respectively mechanically to control the operation of the longitudinal welding press, the sheath-feeding rollers, and the transverse welding press.

2. A machine according to claim 1, wherein the delivery pipe is provided at the upper part thereof with an elbow having a horizontal branch communicating with the reservoir and a vertical branch extending downwards, and the rod carrying the valve being arranged to project through the elbow and out of the delivery pipe.

3. A machine according to claim 2, wherein a valve-closing spring acts on the rod and is arranged to urge the rod to move, in relation to the pipe, in the direction in which the valve is closed.

4. A machine according to claim 3, wherein the rod is associated with operating means arranged to effect longitudinal displacement of the rod in relation to the pipe against the action of the valve-closing spring.

5. A machine according to claim 4, wherein the operating means comprises a solenoid which is carried by the frame and has a movable core connected to the rod by adjustable means permitting the relative position of the core and the rod to be adjusted in the axial direction.

6. A machine according to claim 4, wherein the operating means comprises a cam pivotally mounted on the frame and arranged to be manually operated, and wherein the cam acts on an element connected to the rod by adjustable means permitting adjustment in the axial direction of the relative position of the said element and the rod.

7. A machine according to claim 1, wherein the cam which controls the opertion of the sheath-feeding rollers is associated with a follower forming part of a crank which is fastened on a shaft and connected by gearing sprockets, and a chain to a set of two spaced shafts each of which carries two rollers, the said rollers being arranged to grip the sheath between them, and the cam imparting alternating displacements to the follower over a fraction of the circumference of the cam, and wherein a freewheel coupling is mounted on the shaft between the crank provided with the follower and the rollers.

* * * * *